(12) United States Patent
Ritter et al.

(10) Patent No.: US 10,208,844 B2
(45) Date of Patent: Feb. 19, 2019

(54) DRIVE DEVICE

(71) Applicant: STABILUS GMBH, Koblenz (DE)

(72) Inventors: Andreas Ritter, Hilgert (DE); Oleg Batosky, Lahnstein (DE); Jörg Hillen, Noertershausen (DE)

(73) Assignee: Stabilus GmbH, Koblenz (DE)

( * ) Notice: Subject to any disclaimer, the term of this patent is extended or adjusted under 35 U.S.C. 154(b) by 737 days.

(21) Appl. No.: 14/440,240

(22) PCT Filed: Oct. 31, 2013

(86) PCT No.: PCT/EP2013/072831
§ 371 (c)(1),
(2) Date: May 1, 2015

(87) PCT Pub. No.: WO2014/068068
PCT Pub. Date: May 8, 2014

(65) Prior Publication Data
US 2015/0300468 A1 Oct. 22, 2015

(30) Foreign Application Priority Data

Nov. 2, 2012 (DE) .......................... 10 2012 110 505

(51) Int. Cl.
*F16H 25/24* (2006.01)
*F16D 51/02* (2006.01)
*E05F 15/622* (2015.01)

(52) U.S. Cl.
CPC ....... *F16H 25/2454* (2013.01); *E05F 15/622* (2015.01); *F16D 51/02* (2013.01); *E05Y 2201/49* (2013.01); *E05Y 2800/205* (2013.01); *E05Y 2800/22* (2013.01); *E05Y 2900/546* (2013.01); *F16H 2025/2463* (2013.01)

(58) Field of Classification Search
None
See application file for complete search history.

(56) References Cited

U.S. PATENT DOCUMENTS

| 4,763,764 | A | 8/1988 | Smith | |
|---|---|---|---|---|
| 2007/0289397 | A1* | 12/2007 | Ritter | E05F 15/622 74/22 A |

(Continued)

FOREIGN PATENT DOCUMENTS

| CN | 1891964 | 1/2007 |
|---|---|---|
| CN | 201236569 | 5/2009 |

(Continued)

*Primary Examiner* — Colby M Hansen

(74) *Attorney, Agent, or Firm* — Cozen O'Connor

(57) ABSTRACT

A drive device has a spindle drive having a threaded spindle and a spindle nut arranged on the threaded spindle. The spindle drive is configured to drive a first component element and a second component element so as to be axially movable relative to one another. The spindle drive is reversibly rotatably drivable around an axis of rotation extending coaxial to the threaded spindle by a rotatably driven driveshaft arranged in a housing so as to be fixed with respect to rotation. A brake device prevents axially relative movement of the first component element and second component element relative to one another through axial application of force to the first component element and/or second component element.

7 Claims, 7 Drawing Sheets

(56) References Cited

U.S. PATENT DOCUMENTS

2011/0303032 A1  12/2011  Oberle et al.
2015/0300468 A1  10/2015  Ritter et al.

FOREIGN PATENT DOCUMENTS

| CN | 102031909 | 4/2011 |
| CN | 102486068 | 6/2012 |
| DE | 9409013 | 9/1995 |
| DE | 20 2007 015 597 U1 | 4/2009 |
| DE | 10 2009 029 167 A1 | 6/2010 |
| DE | 10 2012 110505 | 5/2014 |
| JP | S4871283 | 9/1973 |

\* cited by examiner

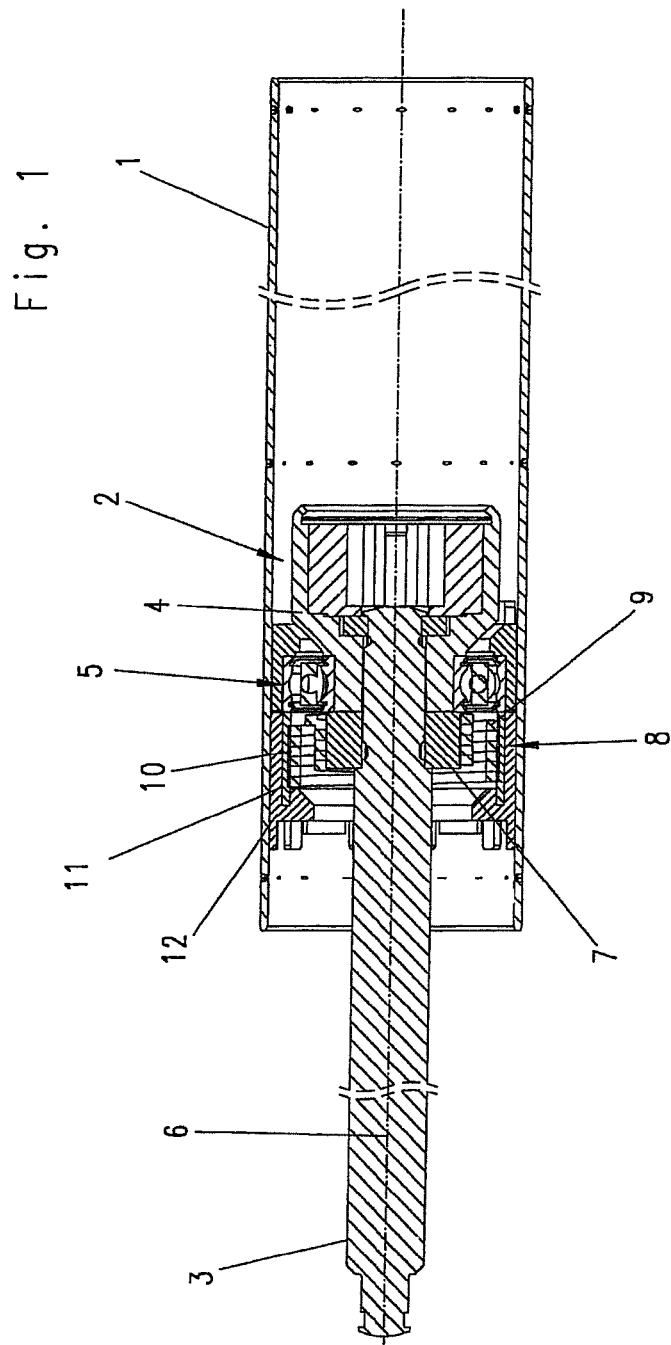

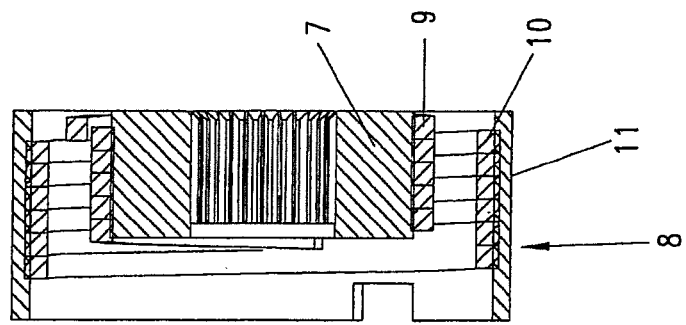
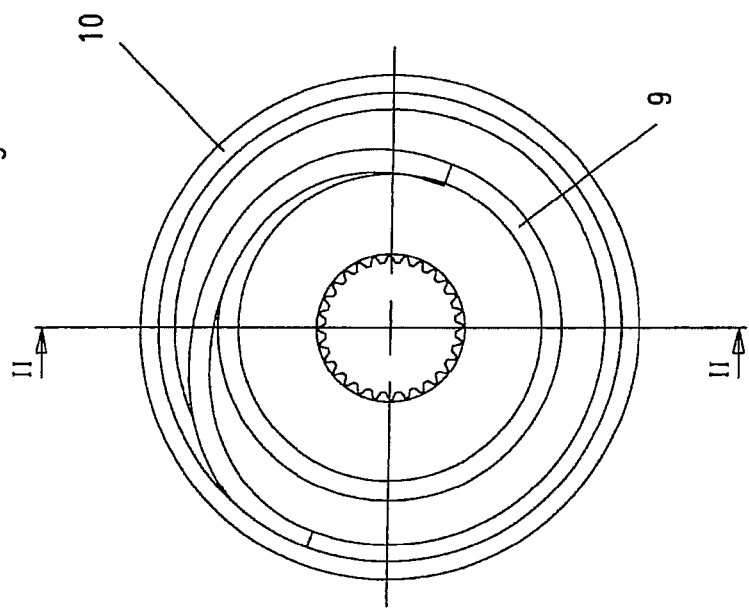

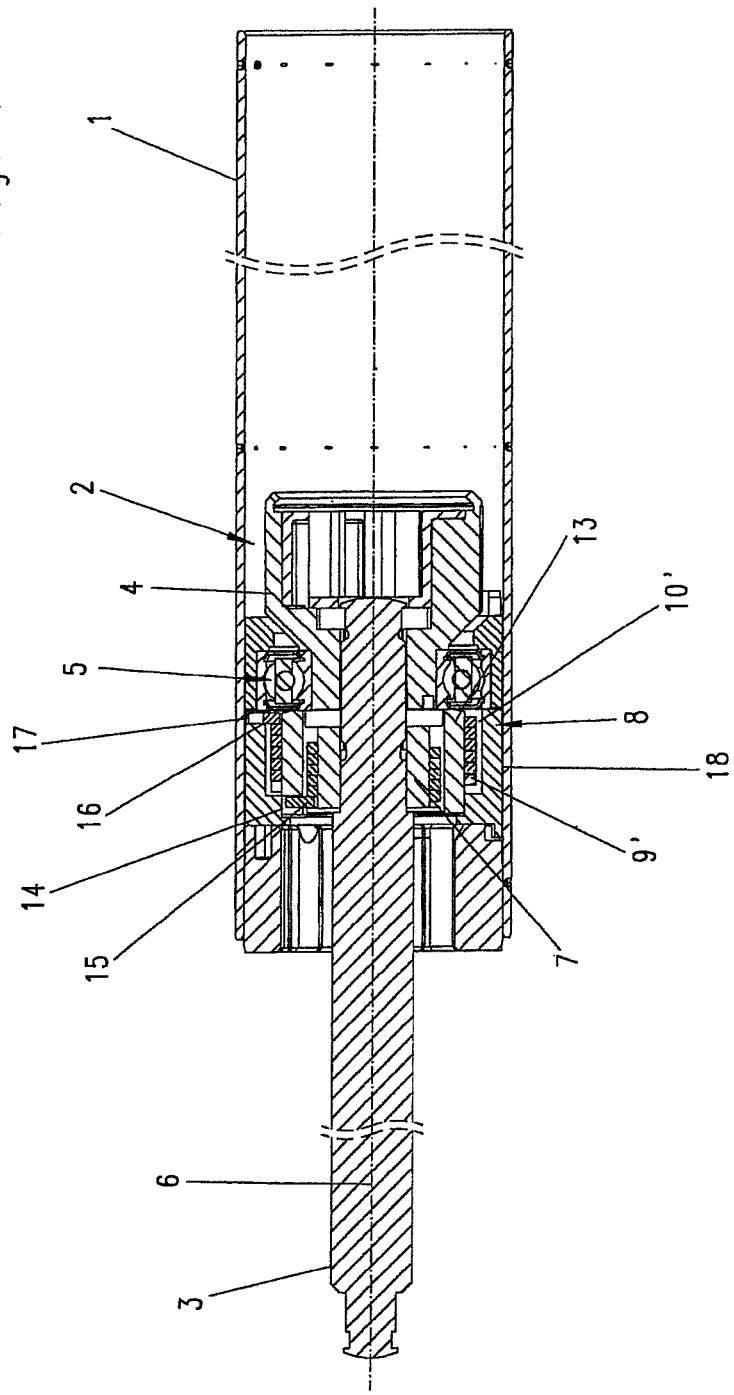

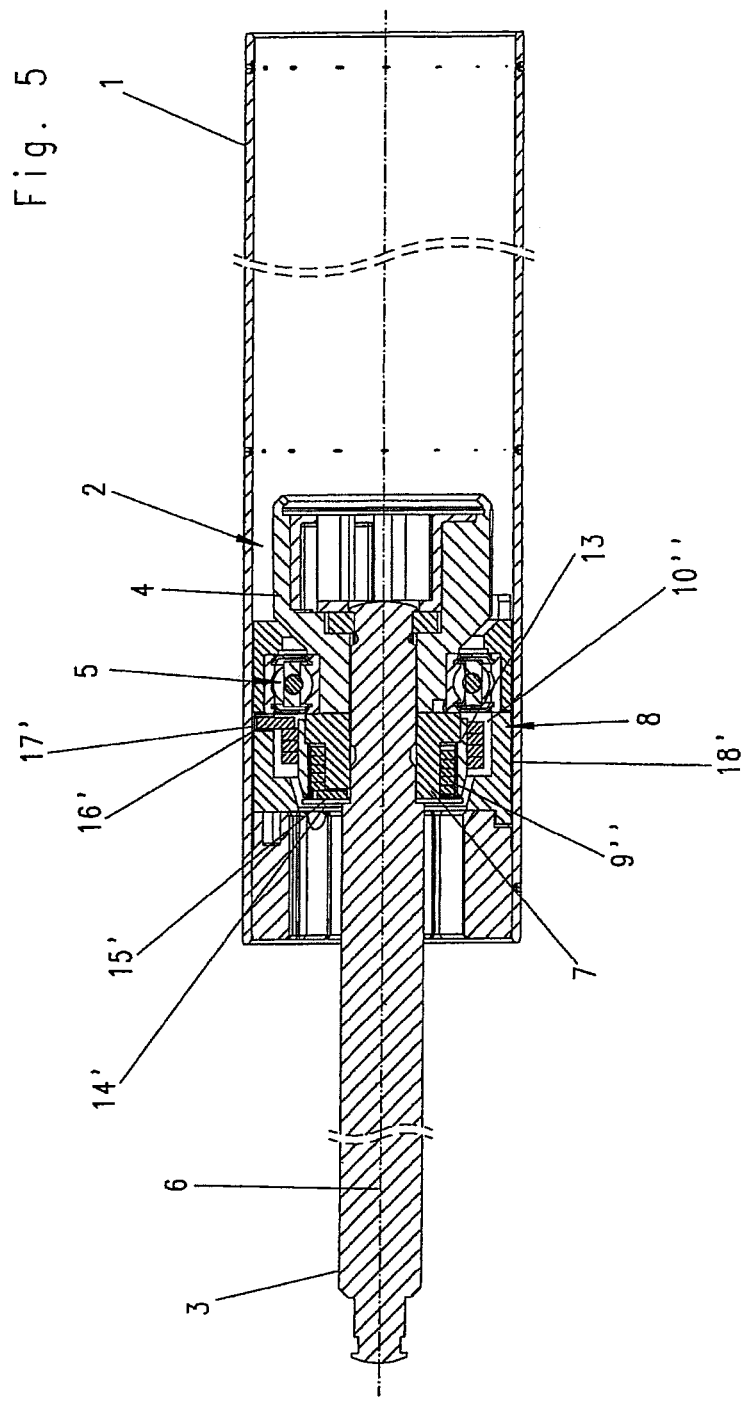

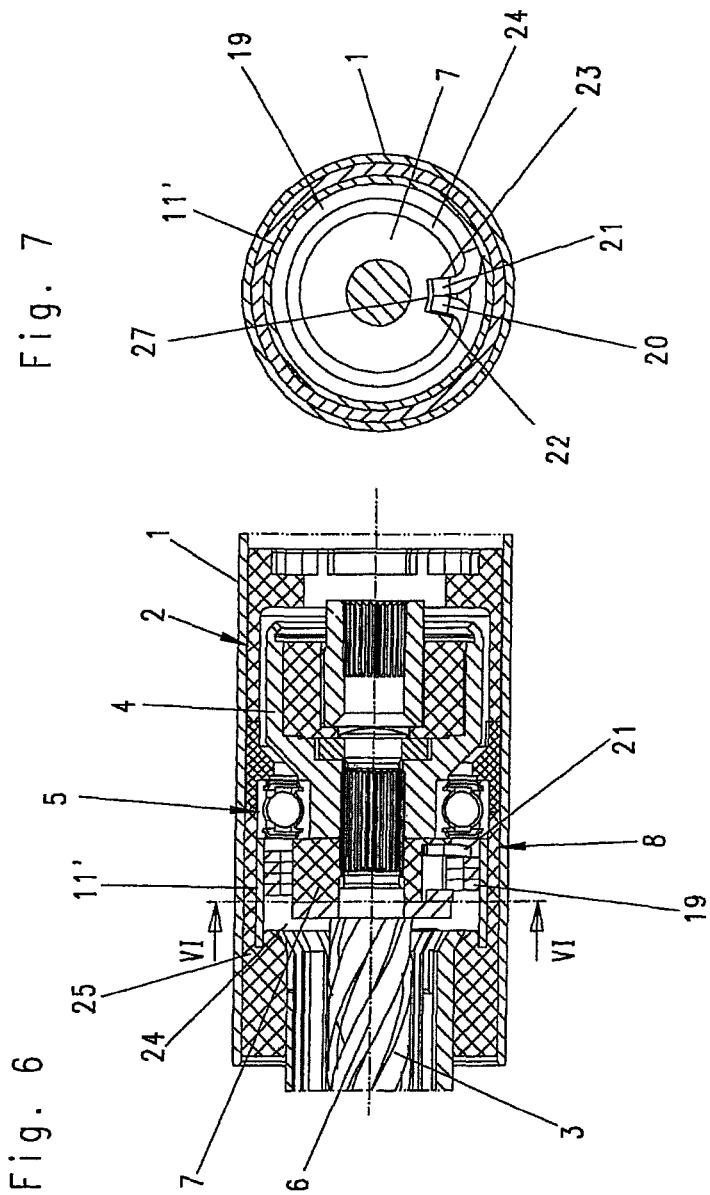

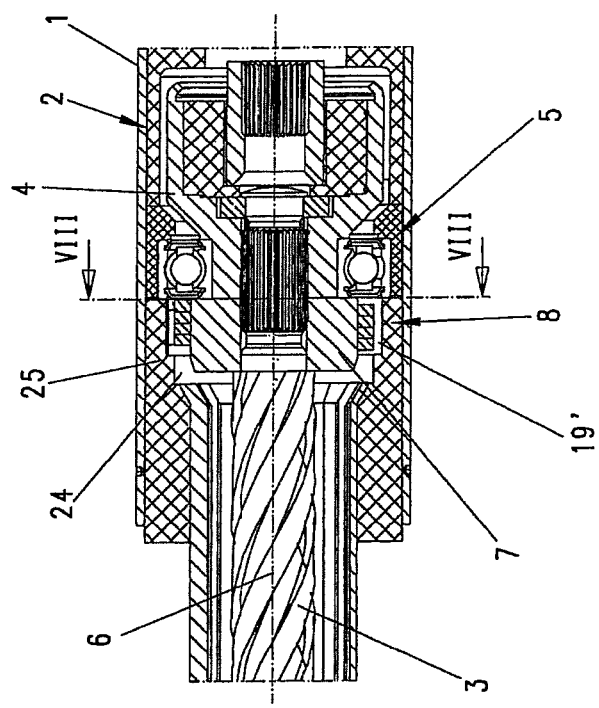
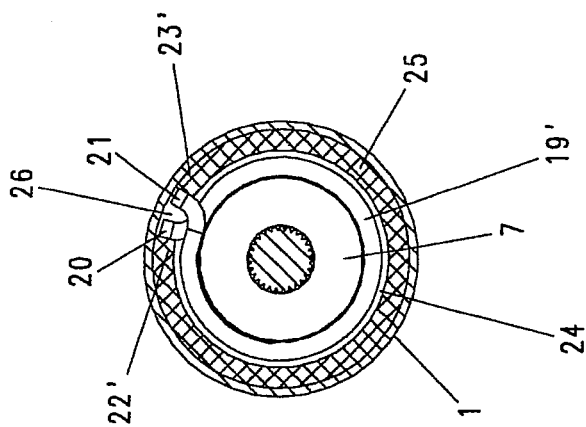

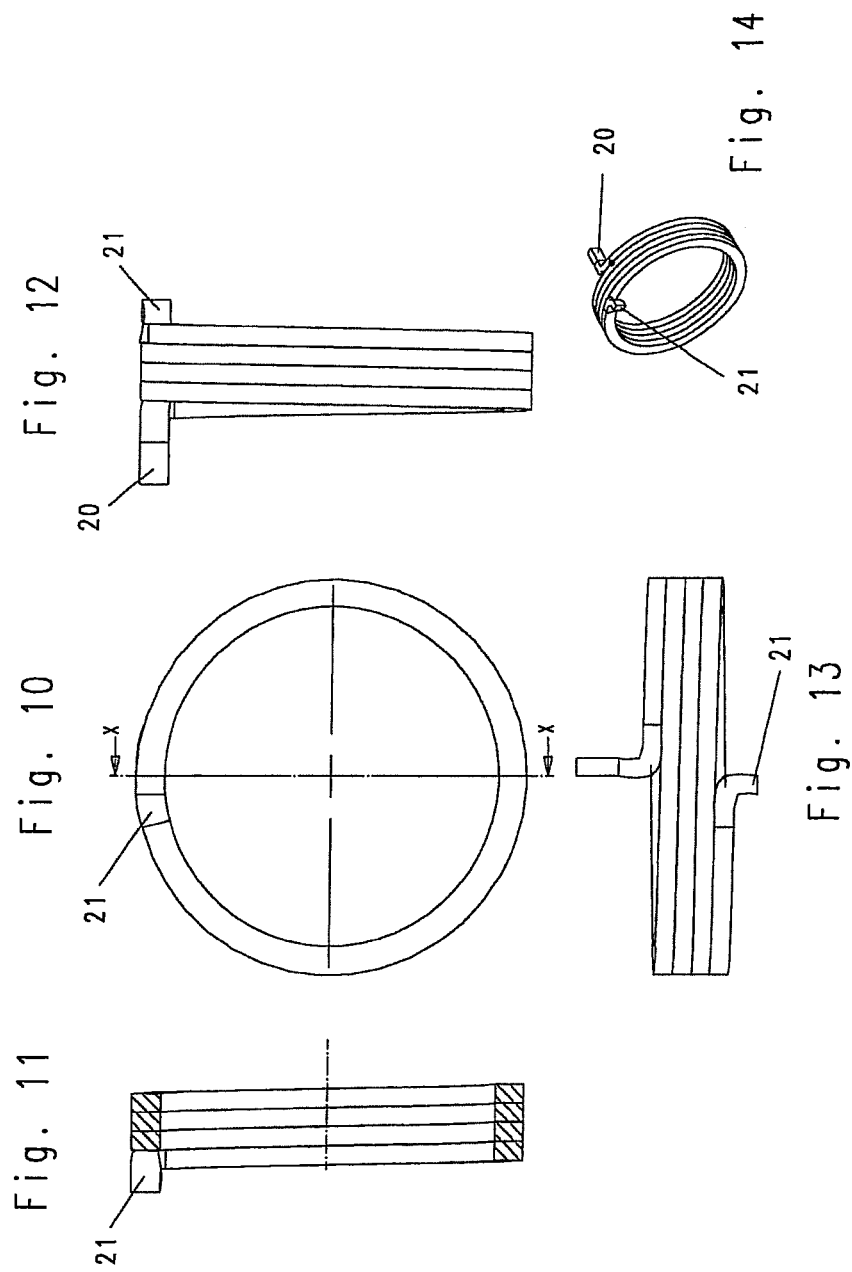

DRIVE DEVICE

CROSS-REFERENCE TO RELATED APPLICATIONS

This is a U.S. national stage of application No. PCT/EP2013/072831, filed on 31 Oct. 2013, which claims priority to the German Application No. DE 10 2012 110 505.7 filed 2 Nov. 2012, the content of both incorporated herein by reference.

BACKGROUND OF THE INVENTION

1. Field of the Invention

The invention is directed to a drive device for a movable component part, with a first fastening element connectable to a stationary first component element and with a second component element movable axially relative thereto at the end opposite the first fastening element and which has, at its end opposite the first fastening element, a second fastening element that can be fastened to the movable component part, with a spindle drive having a threaded spindle and a spindle nut arranged on the threaded spindle, by which spindle drive the first component element and the second component element can be driven so as to be axially movable relative to one another, and the spindle drive can be reversibly rotatably driven around an axis of rotation extending coaxial to the threaded spindle by a driveshaft that can be rotatably driven by a rotary drive arranged in a housing so as to be fixed with respect to rotation relative to it, and with a brake device by which an axially relative movement of the first component element and second component element relative to one another can be prevented through axial application of force to the first component element and/or second component element.

2. Related Art

Drive devices of this type are known in practice, for example, for opening and closing rear hatches, trunk lids, hoods, and occasionally also doors in motor vehicles. To prevent warping of the hatches and hoods, both sides of the hatches are often driven by electric motor.

A problem in drives without brake devices is that the stop position into which the movable component part has been moved cannot be maintained due to unwanted inherent dynamic movements brought on by external forces, resulting in uncontrolled movements of the drive. External forces of this kind may be, for example, the inherent weight of the hatch or spring forces acting on the hatch.

To prevent this, it is known to use a centrifugal brake as brake device. Such centrifugal brakes are bulky and require a large installation space.

SUMMARY OF THE INVENTION

It is an object of the invention to provide a drive device of the type mentioned in the introductory part that is constructed simply and compactly and has a braking action of the brake device in both movement directions allowing different braking torques.

According to an aspect of the invention, this object is met in that the brake device is a wrap spring brake having a switching spring, and a brake spring which are wound in axial direction. When the driveshaft is not driven in rotation, the switching spring is radially frictionally engaged at a first rotationally symmetrical component element and the brake spring is radially frictionally engaged at a second rotationally symmetrical component element, and a rotational movement of the threaded spindle is prevented. The frictional engagement of the switching spring with the first component element can be canceled when the driveshaft is driven in a first rotational direction, and the frictional engagement of the brake spring with the second component element can be canceled when the driveshaft is driven in a second rotational direction. The brake spring engages the second rotationally symmetrical component element with a friction torque that is greater than the friction torque with which the switching spring engages at the second rotationally symmetrical component element.

This arrangement only needs the switching spring and brake spring, which are configured as simply constructed, economical wrap springs and which require small installation space and no actuating device for actuating the brake device. Accordingly, the constructional size of the drive device can be kept small. The actuation of the brake device is carried out automatically by the threaded spindle being driven in rotation or not being driven in rotation as required for operation of the drive device.

The first component element and the second component element can be two parts or can also be formed by one part.

A braking action is carried out by the switching spring and brake spring up to a determined braking torque in both movement directions.

The movable component part can be a hatch, a trunk lid, a hood or a door of a vehicle which is articulated at the body of the vehicle.

In an advantageous configuration, the switching spring and the brake spring have different winding directions and are connected to one another by their one end, and the first rotationally symmetrical component element is a cylindrical part of the threaded spindle or a first cylindrical element fixedly connected to the threaded spindle, and the cylindrical part of the threaded spindle or the cylindrical element is enclosed by the switching spring, and the brake spring engages by its outer circumference at the cylindrical inner wall of the housing or of a second element fixedly connected to the housing.

The quantity of component parts is reduced when the switching spring and the brake spring are formed of one part.

The switching spring and the brake spring can have different diameters.

If the switching spring has the same diameter as the brake spring in the installed state, this results in a reduced diameter of the drive device.

In a further, likewise advantageous configuration, the first rotationally symmetrical component element is a cylindrical part of the threaded spindle or a first cylindrical element that is fixedly connected to the threaded spindle, and the cylindrical part of the threaded spindle or the cylindrical element is enclosed by the switching spring with a coaxially rotatably supported sleeve at which the one end of the switching spring is fixedly arranged, and which is enclosed by the brake spring, one end of the brake spring being fixedly connected to the housing or to a second element that is fixedly connected to the housing.

In this way, the sleeve can enclose the switching spring coaxially at a radial distance, which results in a compact construction.

In a further, likewise advantageous configuration, the first rotationally symmetrical component element can be a cylindrical part of the threaded spindle or a first cylindrical element that is fixedly connected to the threaded spindle, and the cylindrical part of the threaded spindle or the cylindrical element is enclosed at a radial distance by the switching spring, and one end of the switching spring is fixedly connected to the cylindrical part of the threaded spindle or to the threaded spindle, with a rotatably supported sleeve having an inner wall at which the switching spring engages and a cylindrical outer lateral surface at which the brake spring engages, one end of the brake spring being fixedly connected to the housing or to a second element that is fixedly connected to the housing.

In this way, the sleeve can enclose the switching spring.

The object is also met according to an aspect of the invention when the brake device is a wrap spring brake having a brake spring, wherein both free ends of the brake spring are fixed to a non-rotational part of the drive mechanism, and the coil of the brake spring wraps around the threaded spindle or a cylindrical element fixedly connected to the threaded spindle, or wherein both free ends of the brake spring are fixed to the threaded spindle or to an element fixedly connected to the threaded spindle, and the coil of the brake spring engages the inner wall of a sleeve that encloses the brake spring or is connected to a non-rotational part of the drive mechanism.

This configuration has the same advantages as the drive device previously discussed, wherein the quantity of parts is further reduced so that the constructional size of the drive device and the assembly effort for the drive device are reduced even more.

The first cylindrical element which is fixedly connected to the threaded spindle can be a hub which is fixedly arranged on the threaded spindle. In this way, the brake spring can have a greater inner diameter than the outer diameter of the threaded spindle, which leads to an increase in braking torque on the one hand and to a smoother disengagement of the brake spring from the hub on the other hand.

A compact construction results when the threaded spindle is rotatably supported in the housing.

The threaded spindle can preferably be rotatably driven by a reversible electric motor.

BRIEF DESCRIPTION OF THE DRAWINGS

An embodiment example of the invention is shown in the drawings and will be described in more detail in the following. In the drawings:

FIG. 1 is a first embodiment example of a drive device in longitudinal section;

FIG. 2 is a front view of the wrap springs of the drive device according to FIG. 1;

FIG. 3 is a section along line II-II in FIG. 2;

FIG. 4 is a second embodiment example of a drive device in longitudinal section;

FIG. 5 is a third embodiment example of a drive device in longitudinal section;

FIG. 6 is a fourth embodiment example of a drive device in longitudinal section;

FIG. 7 is a section along line VI-VI in FIG. 6;

FIG. 8 is a fifth embodiment example of a drive device in longitudinal section;

FIG. 9 is a section along line VIII-VIII in FIG. 8;

FIG. 10 is a side view of a further embodiment example of a wrap spring of the drive device according to FIG. 8;

FIG. 11 is a section along line X-X in FIG. 10;

FIG. 12 is a side view of the wrap spring according to FIG. 10;

FIG. 13 is a top view of the wrap spring according to FIG. 10; and

FIG. 14 is a perspective view of the wrap spring according to FIG. 10.

DETAILED DESCRIPTION OF THE PRESENTLY PREFERRED EMBODIMENTS

The depicted drive devices have a tubular housing 1 in which is arranged a reversible electric motor, not shown, by which a threaded spindle 3 of a spindle drive can be driven in rotation around an axis of rotation 6 via a clutch 2.

The threaded spindle 3 projects by its end on the motor side into a corresponding coaxial recess of a rotatably drivable clutch part 4 which is rotatably supported in the housing 1 via a grooved ball bearing 5.

A spindle nut, not shown, of the spindle drive is arranged on the threaded spindle 3.

A first component part and a second component part are drivable so as to be axially movable relative to one another by the spindle drive. The first component part can be arranged so as to be stationary and can be, e.g., a body of a vehicle. The second component part can be articulated at the second component part so as to be swivelable around a swiveling axis and can be a hatch of the vehicle.

A hub 7 is fixedly arranged on the threaded spindle 3 adjacent to the grooved ball bearing 5. The hub 7 is part of a wrap spring brake 8, which is actuated when the threaded spindle 3 is driven in rotation by the electric motor, regardless of direction, and prevents a rotation of the threaded spindle up to a determined braking torque when not driven and when the spindle nut is loaded axially.

In the embodiment example of FIGS. 1 to 3, the wrap spring brake 8 has a switching spring 9, which is configured as a wrap spring and which is fitted to the hub 7 under radial pre-loading.

The one end of the switching spring 9 is guided radially outward and forms an end of a brake spring 10, which is configured as a wrap spring and which encloses the switching spring 9 at a radial distance therefrom and is inserted by the radially outer side of its coils into a sleeve 11 under radial pre-loading.

The sleeve 11 is fixedly inserted into the housing 1 via a supporting ring 12.

The switching spring 9 and brake spring 10, which are formed as installation parts are wound in the same rotational direction but in opposite axial directions.

When the threaded spindle 3 and the hub 7 fixedly arranged thereon rotate in one direction, the friction between the lateral surface of the hub 7 and the inner side of the switching spring 9 increases until the switching spring 9 and brake spring 10 rotate with the hub 7. Through rotation of the brake spring 10, the friction between the outer side of the second wrap spring 10 and the stationary sleeve 11 is reduced so that the brake spring 10 slips at the inner side of the sleeve 11.

When the threaded spindle 3 and the hub 7 rotate in the other direction, the friction between the outer side of the hub 7 and the inner side of the switching spring 9 decreases, and the friction between the sleeve 11 and the outer side of the brake spring 10 is increased so that the brake spring 10 cannot rotate relative to the sleeve 11. However, the inner side of the switching spring 9 can slip on the hub 7. As a result of the different coil diameters of the switching spring 9 and brake spring 10, a different braking torque can be achieved depending on the rotating direction of the hub.

The magnitude of braking torque can be adjusted by the pre-loading of the switching spring 9 on the hub or of the brake spring 10 in the sleeve 11.

With a correspondingly slight adjustment of the braking torque in one direction, an unlocking can be carried out in this direction.

A switching spring 9', which is configured as a wrap spring and which is fitted to the hub 7 under radial pre-loading, is provided in the embodiment example in FIG. 4.

The switching spring 9' is enclosed at a radial distance by a sleeve 13, which is supported so as to be rotatable around an axis of rotation 6 and which has, at one axial end thereof, a radially directed first recess 14 into which the one radially outwardly bent coil end 15 of the switching spring 9' projects.

The brake spring 10', which is configured as a wrap spring, is fitted to the outer cylindrical lateral surface of the sleeve 13 under radial pre-loading. The one coil end 16 of the brake spring 10' is bent radially outward and projects into a second radial recess 17, which is formed in an annular supporting part 18 that encloses the brake spring 10' at a radial distance and is fixedly inserted into the housing 1.

When the hub 7 rotates in one direction, the friction between the hub 7 and the inner side of the switching spring 9' increases until the switching spring 9' rotates with the hub 7.

When the switching spring 9' rotates, the sleeve 13 also rotates along with it via the coil end 15. The sleeve 13 slips on the brake spring 10' which is firmly held by the supporting part 18 via coil end 16 and cannot rotate.

When the hub 7 rotates in the other direction, the friction between the outer side of the hub and the switching spring 9' decreases. Since the brake spring 10' is held in the supporting part 18, the sleeve 13 cannot rotate because of the pre-loading of the brake spring 10' on the sleeve 13. Therefore, the switching spring 9' also cannot rotate, since the latter is held by the sleeve 13. The hub 7 slips at the inner side of the switching spring 9'.

The winding directions of the switching spring 9' and brake spring 10' and the supports of the coil ends 15 and 16 are such that when the hub 7 rotates in one rotational direction, the switching spring 9' or brake spring 10', respectively, opens and the brake spring 10' or switching spring 9', respectively, closes, and when the hub 7 rotates in the other rotational direction, the brake spring 10' or switching spring 9', respectively, opens and the switching spring 9' or brake spring 10', respectively, closes.

Due to the different coil diameters of the switching spring 9' and brake spring 10', a different braking torque is achieved depending on the rotational direction of the hub 7. In this embodiment example also, the magnitude of braking torque can be adjusted by the pre-loading of the switching spring 9' on the hub 7 or of the brake spring 10' on the sleeve 13.

In the embodiment example in FIG. 5, a switching spring 9', which is configured as a wrap spring, encloses the hub 7 with radial clearance, the one coil end 15' of the switching spring 9' being bent radially inward and extending into a first recess 14' formed radially in the hub 7. The switching spring 9' is inserted into the rotatably supported sleeve 13' so as to engage the inner wall of the sleeve 13' under radial pre-loading.

A brake spring 10" configured as a wrap spring is fitted to the outer cylindrical lateral surface of the sleeve 13' so as to enclose the sleeve 13' under radial pre-loading.

One coil end 16' of the brake spring 10" is bent radially outward and projects into a second recess 17', which is formed in an annular supporting part 18' enclosing the brake spring 10". The supporting part 18' is fixedly inserted into the housing 1.

When the hub 7 rotates in one direction, the switching spring 9" is rotated along with the hub 7 via the coil end 15' projecting into the first recess 14' of the hub. The friction between the switching spring 9" and the sleeve 13' is increased, and the sleeve 13' rotates along with it. The brake spring 10", which is fixedly held at the supporting part 18' by the coil end 16' projecting into the second recess 17', slips on the sleeve 13'.

When the hub 7 rotates in the other direction, the switching spring 9" rotates along via the coil end 15'. Accordingly, the friction between the cylindrical lateral surface of the sleeve 13' and the switching spring 9" is reduced. Since the brake spring 10" is held in the supporting part 18', the sleeve 13' cannot rotate because of the pre-loading of the brake spring 10" on the sleeve 13'. The switching spring 9' slips at the inner side of the sleeve 13'.

The winding directions of the switching spring 9" and brake spring 10" and the coil ends 15' and 16' projecting into the recesses 14' and 17' are configured such that when the hub 7 rotates in one rotational direction, the switching spring 9" or brake spring 10", respectively, opens and the brake spring 10" or switching spring 9", respectively, closes. During a rotation in the opposite rotational direction, the sequence is reversed. The different diameters of the switching spring 9" and brake spring 10" cause different braking torques depending on the rotational direction of the hub 7.

The magnitude of braking torque can be adjusted by the pre-loading of the switching spring 9" and of the brake spring 10" on the sleeve 13'.

In the embodiment example of FIGS. 6 and 7, the hub 7 is enclosed at a radial distance by a sleeve 11', which is fixedly inserted into the housing 1 via a supporting part 25.

A brake spring 19, formed as a wrap spring, is arranged in the annular space 24 between the hub 7 and sleeve 11' and engages the inner wall of the sleeve 11' by its outer side.

Both coil ends 20 and 21 of the brake spring 19 are bent radially inward and project into a radial recess 27 of the hub 7, the side walls of this radial recess 27 directed in circumferential direction forming stops 22 and 23. The distance between the stops 22 and 23 is greater than the width of the coil ends 20 and 21 in circumferential direction.

In the inactive position of the drive device, the hub 7 is fixed against rotation up to a determined torque by the brake spring 19, which encloses the hub 7 under frictional engagement.

When hub 7 rotates with a torque greater than the determined torque, friction is generated between the brake spring 19 and the inner side of the sleeve 11' so that the diameter of the brake spring 19 is slightly reduced and, depending on the rotational direction, the brake spring 19 lifts coil end 20 from stop 22 or coil end 21 from stop 23. Accordingly, the brake spring 19 slips at the sleeve 11', and hub 7 and threaded spindle 3 can rotate around the axis of rotation 6.

In the embodiment example of FIGS. 8 and 9, an annular space 24 is formed between the hub 7 and an annular supporting part 25, which is fixedly inserted into the housing 1, a brake spring 19' formed as wrap spring being arranged in this annular space 24. The brake spring 19' encloses the hub 7 and frictionally engages the radially extending outer surface of the hub 7 in the inactive position of the drive device such that the hub 7 is fixed against rotation around the axis of rotation 6 up to a determined torque.

The coil ends 20 and 21 of the brake spring 19' are bent radially outward and project into a radial recess 26 of the supporting part 25.

The side walls of the recess 26 which are directed in circumferential direction form stops 22' and 23', the distance between these stops 22' and 23' being greater than the width of the coil ends 20 and 21 in circumferential direction.

When hub 7 rotates with a torque greater than the determined torque, friction is generated between the brake spring 19' and the hub 7 so that the brake spring 19' expands slightly in diameter and, depending on the rotation direction, lifts coil end 20 from stop 22' or lifts coil end 21 from stop 23'. Accordingly, the brake spring 19 slips at the hub 7, and the hub 7 and threaded spindle 3 can rotate around the axis of rotation 6.

FIGS. 10 to 14 show that the coil ends 20 and 21 of the brake spring 19 and 19' can also extend axially, so that the recesses 22 and 26, respectively, must also be axially aligned.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A drive device to provide relative movement between a stationary first component element and a second component element movable axially relative to the stationary first component element, comprising:
    a housing;
    a spindle drive, arranged in the housing and having a threaded spindle and a spindle nut arranged on the threaded spindle, configured to drive the first component element and the second component element so as to be axially movable relative to one another, the spindle drive being reversibly rotatably drivable around an axis of rotation extending coaxial to the threaded spindle by a rotatably drivable driveshaft; and
    a brake device arranged in the housing, the brake device being configured to prevent axially relative movement of the first component element and second component element relative to one another through axial application of force to the first component element and/or second component element,
    wherein the brake device comprises:
    a first rotationally symmetrical component element;
    a second rotationally symmetrical component element;
    a wrap spring brake having a switching spring (9, 9', 9") and a brake spring (10, 10', 10") each wound in an axial direction,
    wherein, when the driveshaft is not rotatably driven in rotation, the switching spring (9, 9', 9") is radially frictionally engaged at the first rotationally symmetrical component element and the brake spring (10, 10', 10") is radially frictionally engaged at the second rotationally symmetrical component element, and a rotational movement of the threaded spindle (3) is prevented, wherein the frictional engagement of the switching spring (9, 9', 9") with the first rotationally symmetrical component element can be canceled when the driveshaft is driven in a first rotational direction, and the frictional engagement of the brake spring (10, 10', 10") with the second rotationally symmetrical component element can be canceled when the driveshaft is driven in a second rotational direction,
    wherein the brake spring (10, 10', 10") engages the second rotationally symmetrical component element with a friction torque that is greater than the friction torque with which the switching spring (9, 9', 9") engages at the second rotationally symmetrical component element, and
    wherein the switching spring (9) and the brake spring (10) have different winding directions and are connected to one another by their respective ends, and the first rotationally symmetrical component part is a cylindrical part of the threaded spindle (3) or a first cylindrical element fixedly connected to the threaded spindle (3), wherein the cylindrical part of the threaded spindle (3) or the first cylindrical element is enclosed by the switching spring, and wherein the brake spring (10) engages, by its outer circumference, at a cylindrical inner wall of the housing (1) or of a second element fixedly connected to the housing (1).

2. The drive device according to claim 1, wherein the switching spring (9) and the brake spring (10) are formed of one part.

3. The drive device according to claim 2, wherein the switching spring (9) and the brake spring (10) have different diameters.

4. The drive device according to claim 2, wherein the switching spring has the same diameter as the brake spring.

5. The drive device according to claim 1, wherein the first rotationally symmetrical component element is a cylindrical part of the threaded spindle (3) or a first cylindrical element fixedly connected to the threaded spindle (3), wherein the cylindrical part of the threaded spindle (3) or the cylindrical element is enclosed by the switching spring (9') with a coaxially rotatably supported sleeve (13) at which the one end of the switching spring (9') is fixedly arranged, and which is enclosed by the brake spring (10'), one end of the brake spring (10') being fixedly connected to the housing (1) or to a second element fixedly connected to the housing (1).

6. The drive device according to claim 1, wherein the first rotationally symmetrical component element is a cylindrical part of the threaded spindle (3) or a first cylindrical element fixedly connected to the threaded spindle (3), wherein the cylindrical part of the threaded spindle (3) or the cylindrical element is enclosed at a radial distance by the switching spring (9"), and wherein one end of the switching spring (9") is fixedly connected to the cylindrical part of the threaded spindle (3) or to the threaded spindle (3), with a rotatably supported sleeve (13) having an inner wall at which the switching spring (9") engages and an outer cylindrical lateral surface at which the brake spring (10") engages, one end of the brake spring (10") being fixedly connected to the housing (1) or to a second element fixedly connected to the housing (1).

7. The drive device according to claim 1, wherein the second component element is a hatch of a vehicle.

* * * * *